United States Patent
Kuehne

(10) Patent No.: US 11,327,559 B2
(45) Date of Patent: May 10, 2022

(54) METHOD AND SYSTEM FOR EVALUATING VIRTUAL CONTENT REPRODUCED IN MOTOR VEHICLES

(71) Applicant: AUDI AG, Ingolstadt (DE)

(72) Inventor: Marcus Kuehne, Beilngries (DE)

(73) Assignee: AUDI AG, Ingolstady (DE)

( * ) Notice: Subject to any disclaimer, the term of this patent is extended or adjusted under 35 U.S.C. 154(b) by 0 days.

(21) Appl. No.: 17/262,510

(22) PCT Filed: May 21, 2019

(86) PCT No.: PCT/EP2019/063013
§ 371 (c)(1),
(2) Date: Jan. 22, 2021

(87) PCT Pub. No.: WO2020/020509
PCT Pub. Date: Jan. 30, 2020

(65) Prior Publication Data
US 2021/0311547 A1   Oct. 7, 2021

(30) Foreign Application Priority Data

Jul. 25, 2018   (DE) ..................... 10 2018 212 410.8

(51) Int. Cl.
*G06F 3/01* (2006.01)
*B60K 35/00* (2006.01)
(Continued)

(52) U.S. Cl.
CPC .............. *G06F 3/012* (2013.01); *B60K 35/00* (2013.01); *G02B 27/0093* (2013.01);
(Continued)

(58) Field of Classification Search
CPC .......... G02B 27/017; G02B 2027/0178; G02B 2027/0134; G02B 2027/014;
(Continued)

(56) References Cited

U.S. PATENT DOCUMENTS 11,145,294 B2 * 10/2021 Vescovi .............. G10L 15/1815
2011/0040707 A1   2/2011 Theisen et al.
(Continued)

FOREIGN PATENT DOCUMENTS

DE   10 2014 009 302 A1   12/2015
DE   10 2015 003 882 A1   9/2016
(Continued)

OTHER PUBLICATIONS

Translation by WIPO dated Jan. 28, 2021 of International Preliminary Report on Patentability from International Application No. PCT/EP2019/063013, 9 pages.
International Search Report dated Jul. 29, 2019 from International Application No. PCT/EP2019/063013, 4 pages.
International Preliminary Report on Patentability dated Nov. 10, 2020 from International Application No. PCT/EP2019/063013.

*Primary Examiner* — Nelson M Rosario
(74) *Attorney, Agent, or Firm* — Staas & Halsey LLP

(57) ABSTRACT

Data characterizing a section of a route traveled by a motor vehicle during reproduction of virtual contents, reproduced virtual contents and/or states of vehicle occupants during reproduction of the virtual contents are transferred to a vehicle-external server device. The transferred data are evaluated by the vehicle-external server device.

16 Claims, 1 Drawing Sheet

(51) Int. Cl.
   *G02B 27/00* (2006.01)
   *G02B 27/01* (2006.01)
(52) U.S. Cl.
   CPC ........ *G02B 27/017* (2013.01); *B60K 2370/31* (2019.05); *B60K 2370/785* (2019.05); *G02B 2027/014* (2013.01); *G02B 2027/0178* (2013.01); *G02B 2027/0187* (2013.01)
(58) Field of Classification Search
   CPC ........ G02B 27/0093; G02B 2027/0187; G06F 3/0481; G06F 3/0487; G06F 3/1454; G06F 3/011; G06F 3/012; G06F 3/04815; G06F 3/014; G06T 19/006; G06T 15/503; B60K 35/00; B60K 2370/31; B60K 2370/785
   See application file for complete search history.

(56) References Cited

U.S. PATENT DOCUMENTS

2014/0067768 A1   3/2014  Fateh et al.
2018/0188054 A1*  7/2018  Kennedy ............. G06F 16/4387

FOREIGN PATENT DOCUMENTS

DE   10 2015 205 921 A1   10/2016
DE   10 2018 212 410.8     7/2018
WO  PCT/EP2019/063013      5/2019

* cited by examiner

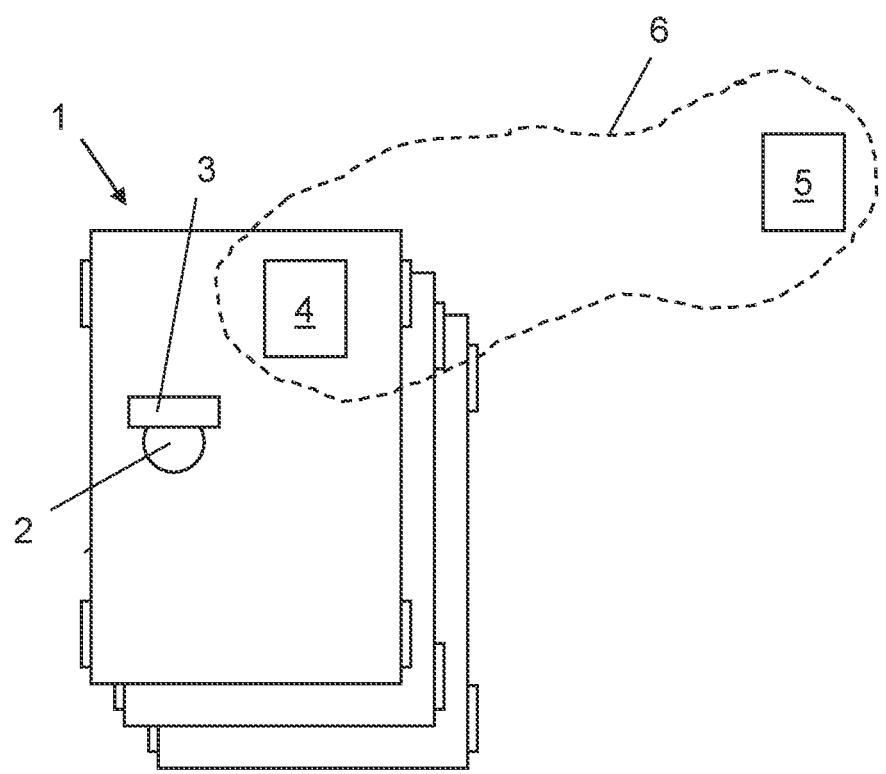

METHOD AND SYSTEM FOR EVALUATING VIRTUAL CONTENT REPRODUCED IN MOTOR VEHICLES

CROSS REFERENCE TO RELATED APPLICATIONS

This application is a U.S. national stage of International Application No. PCT/EP2019/063013, filed on May 21, 2019. The International Application claims the priority benefit of German Application No. 10 2018 212 410.8 filed on Jul. 25, 2018. Both the International Application and the German Application are incorporated by reference herein in their entirety.

BACKGROUND

There is a high probability that in the future, at the latest when autonomous driving is used, it will become established practice to equip motor vehicles with ways of permitting vehicle occupants to consume virtual contents during the journey. This can be done, for example, by virtual reality glasses or augmented reality glasses which the vehicle occupants have put on during the journey.

The reproduction of virtual contents, for example with virtual reality glasses, is already known per se. For example, US 2014/0067768 A1 presents a method for assigning contents and tracking a progression in virtual or augmented reality. The method permits a progression of a use of the virtual or augmented reality to be recorded on a server of a service provider, wherein at a later time an earlier state can be re-established.

DE 10 2015 205 921 A1 presents a method for operating data glasses which are put on by a driver. A load state of the driver with respect to a driving situation is sensed by sensors, wherein in order to minimize distraction of the driver contents which are displayed by the data glasses are removed from the display when necessary.

DE 10 2014 009 302 A1 presents a method for operating virtual reality glasses, wherein a wearer of the virtual reality glasses can jump from one virtual observation position to the next in order to change his virtual standpoint suddenly within a displayed virtual surroundings.

SUMMARY

Described herein is a way in which the reproduction of virtual contents in motor vehicles can be improved. This is achieved by a method and system for evaluating virtual contents reproduced in motor vehicles In the method described below for evaluating virtual contents reproduced in motor vehicles, data which characterize a section of a route traveled by a motor vehicle during the reproduction of the virtual contents, reproduced virtual contents and/or states of vehicle occupants during the reproduction of the virtual contents are transferred to a vehicle-external server device. The transferred data are evaluated by a vehicle-external server device.

It is therefore possible, such as in an anonymized fashion, to acquire and comprehensively evaluate and process information indicating when, where and for how long which virtual contents are used. As a result, developers and suppliers of such virtual contents can be provided with the most comprehensive possible picture of the application performance, but also possible weaknesses of their own contents.

It is also possible to provide that the data are not transferred to the server device until it is sensed, in particular only when it is sensed, that a respective reproduction of virtual contents in one of the motor vehicles has been terminated by the respective vehicle occupant.

The transfer of data may be carried out when the respective reproduction of the virtual contents has been terminated by the respective vehicle occupant himself, that is to say the respective reproduction has been terminated by the vehicle occupant before its expected end has been reached. The method is based here on the realization that a termination of the respective reproduction of the virtual contents before the anticipated end or else generally unusually quickly is an indication of a corresponding deficiency in the reproduction of the virtual contents. If such a termination occurs, this is in itself already important information to the effect that the virtual contents which are offered and reproduced should be improved.

As a result of the fact that data which data which characterize a respective section of a route traveled along by the respective motor vehicle during the reproduction of the virtual contents are transferred to the vehicle-external server device, the device can evaluate to what extent a profile of the section of a route respectively traveled along could possibly have led to a termination of the respective virtual content.

Since data relating to the respective reproduced contents which have been terminated are alternatively or additionally transferred to the vehicle-external server device, the reproduced virtual contents which have been terminated can themselves be investigated or evaluated to determine to what extent they have contributed to the fact that the respective vehicle occupant has prematurely interrupted the reproduction.

Given knowledge of data which characterize states of the respective vehicle occupants during the reproduction of the virtual contents, it is possible to use the vehicle-external server device to investigate to what extent respective states of the vehicle occupants, in particular with respect to what is referred to as motion sickness or simulator sickness, have caused the respective reproduction to be interrupted early. In particular given knowledge of the section of a route respectively traveled along, of the respectively reproduced virtual contents and of a respective state of the respective vehicle occupant who has interrupted the reproduction of the virtual content, a particularly complete and informative evaluation of terminations or termination rates during the reproduction of virtual contents in motor vehicles is possible. By evaluating these data in the vehicle-external server device, it is possible to optimize the offered virtual contents, in particular with adaptation to different sections of routes and different types of users.

It is also possible that at least some of the data or all of the data are also transferred to the vehicle-external server device when the respective reproduction of the virtual contents has not been terminated. This can be done, for example, continuously with the use or with the reproduction of the virtual contents. It is, for example, also possible that respective users are requested to provide an assessment at the end after they have consumed the virtual contents. In this context, there may be provision that particularly good and particularly poor assessments automatically lead to the data being transferred to the vehicle-external server device. The assessment can be done, for example, with a points system. Particularly high and particularly low point scores can then trigger the transmission of the data. The particularly poor and particularly good assessments are very helpful indications for improving the virtual contents on a continuous basis and adapting the content to the users' requirements. The users can, for example, also consent to certain data items, e.g. relating to the section of a route traveled along, the virtual contents and/or the user states, being able to be transmitted in a non-anonymized fashion. This permits the offered virtual contents to be improved in a way which is tailored individually to the respective user. If there is no explicit consent to transmit the data in a non-anonymized fashion, all the data are transmitted in an anonymized fashion so that it is not possible to establish a relationship between the data and the respective users.

One advantageous embodiment provides that the virtual contents are reproduced by respective virtual reality glasses, augmented reality glasses or augmented reality contact lenses which are worn by the vehicle occupants, or by contact-analogous displays which are integrated into respective windows of the motor vehicles. By virtual reality glasses it is possible for the respective vehicle occupants to completely screen themselves off visually from their surroundings so that they can completely immerse themselves visually in the virtual contents. By augmented reality glasses or augmented reality contact lenses or by contact-analogous displays it is possible to include virtual contents in the display, the contents augmenting the reality which the respective vehicle occupant perceives visually.

A further advantageous embodiment provides that with regard to the respective reproduced contents, information indicating how strong virtual movements within a respective displayed virtual surroundings were and/or what kind of story has been reproduced by the virtual contents is transferred to the server device. Particularly strong virtual movements, in particular in combination with movements which are contrary thereto, can in reality lead to what is referred to as simulator sickness. Therefore, the virtual movements within the respectively displayed virtual surroundings are an important indication of how terminations of reproduced virtual contents are to be assessed. In addition to the occurrence of sickness, an important role is additionally also played by the extent to which a respective story which has been represented by the virtual contents was interesting or less interesting for the respective vehicle occupants. Given knowledge of information or data in this regard, it is also possible to draw conclusions about why certain reproductions of virtual contents have been terminated.

According to a further advantageous embodiment, there is provision that information indicating when the reproduction of the virtual contents was terminated is transferred to the server device. For example, it is possible to transfer data or information which characterize how long before its expected end the respective reproduction had reached when it was terminated. If certain reproduced virtual contents are terminated particularly early, then a particularly low acceptance with the respective vehicle occupant can be concluded. The termination time of the respective reproduction of the virtual contents therefore constitutes important information to the effect that terminations or termination rates of the reproductions of the virtual contents should be evaluated and analyzed.

In a further advantageous refinement, there is provision that with regard to the section of a route traveled by the respective motor vehicles during the reproduction of the virtual contents, a respective bend profile and/or altitude profile of the section of a route is acquired and transferred to the server device. The method based in this context on the realization that when there is a particularly good correspondence between virtual movements and real movements the reproduced virtual contents are perceived as appearing particularly realistic, wherein when there is a high degree of correspondence the motion sickness or the simulator sickness can also be counteracted. In this respect, the bend profiles or altitude profiles of the section of a route respectively traveled along offer valuable information for evaluation of the terminated reproductions of the virtual contents.

A further advantageous embodiment provides that during the reproduction of the virtual contents, body measurement values which characterize sickness on the part of the vehicle occupants are sensed by a sensing device which is located in the vehicle and/or by sensing devices which are worn by the vehicle occupants and transferred to the server device, which determines respective sickness values on the basis thereof. For example, it is possible that a pulse and/or head movements are sensed as body measurement values which characterize sickness on the part of the vehicle occupants. Given knowledge of these body measurement values it is possible to carry out analyses as to whether and to what extent the occurrence of sickness owing to the simulator sickness or motion sickness the reproduction of certain virtual contents has been terminated. For example, it is therefore possible to sense the head movements of the vehicle occupants by cameras provided in the vehicle passenger compartment. If in this context it is detected, for example, that the respective vehicle occupant moves his head only to a small degree or even no longer moves it, this can be an indication that he is becoming nauseous particularly owing to the consumption of the reproduced virtual contents. A rising pulse can also be an indication that the respective vehicle occupant is currently suffering motion sickness or simulator sickness. The pulse of the vehicle occupants can be sensed, for example, by a smart watch or the like which the vehicle occupant is wearing on the wrist. Furthermore, a very wide variety of other body measurement values can also be sensed and transferred to the server device, which values can provide informative indications of the occurrence of motion sickness or simulator sickness.

In a further advantageous refinement, there is provision that the server device is used to determine with which combinations of respective sections of routes and respective virtual contents the determined sickness values have exceeded a predefined sickness value, wherein those combinations with which the predefined sickness value has been exceeded are offered for reproduction less frequently in the future than previously. As a result, unfavorable combinations of specific route profiles and specific virtual contents can be offered to a lesser extent in the future. If there is provision for example in the case of a specific virtual experience which is to be reproduced that very strong virtual movements occur, it may be unfavorable to pair this virtual result with a route profile which has no upward and downward movements and also no bends. Conversely, it may also be disadvantageous if the route profile is very unsteady, for example in terms of the respective bend profile and altitude profile, wherein a specific virtual experience tends to contain steady virtual movements or even no virtual movements. By comparing the determined sickness values with the predefined sickness value, it is therefore possible to filter out unfavorable combinations in respect of the route profile and the respective virtual contents and offer them less frequently for future reproductions.

According to a further advantageous embodiment, there is provision that if it is sensed that a reproduction of virtual contents in one of the motor vehicles has been terminated by a vehicle occupant, it is additionally sensed whether the respective vehicle occupant then causes another virtual content to be reproduced or desists from reproducing any virtual contents, wherein data relating to this are likewise transferred to the server device. If the respective vehicle occupant causes another virtual content to be displayed, for example directly after the termination, without the occupant for example prematurely interrupting the virtual content, this can be a good indication that the occupant simply did not find the previously terminated virtual content good in terms of content, but not that he was basically disinclined to enjoy virtual contents during the journey. By comparing the terminated virtual contents and the virtual contents called up afterwards, it is also possible to acquire further knowledge as to which virtual contents have brought about the termination of the previously reproduced virtual contents. If the vehicle occupant desists from reproducing any virtual contents after the termination, this can be, for example, an indication that the vehicle occupant per se is disinclined to such virtual contents or that, for example, he became so nauseous that he firstly requires a relatively long pause with respect to the consumption of further virtual contents.

A further advantageous embodiment provides that if it is sensed that a reproduction of virtual contents in one of the motor vehicles has been terminated by a vehicle occupant, an inquiry as to why he has terminated the reproduction is additionally output to the respective vehicle occupant, wherein data relating to a response of the vehicle occupant are likewise transferred to the server device. In this way, quite specific information can be acquired from the vehicle occupant as to why he has terminated the reproduction of these quite specific virtual contents.

In a further advantageous refinement, there is provision that if it is sensed that a reproduction of virtual contents has not been terminated by a vehicle occupant until the reproduction has reached its expected end, an assessment is requested from the respective vehicle occupant, wherein data relating to an assessment by the vehicle occupant are likewise transferred to the server device. In this way, for example a positive assessment by the vehicle occupant can also be transferred to the server device. Quite basically, the requested assessment by the vehicle occupant helps to continuously improve the reproduction of the virtual contents.

A further advantageous embodiment provides that during the assessment there is an inquiry as to how the reproduced virtual contents have fitted the section of a route traveled along during that time. It is therefore possible to draw valuable conclusions as to the degree to which the reproduced virtual contents must fit the section of a route traveled along during that time so that reproduced virtual contents are not terminated before their expected end.

According to a further advantageous embodiment, there is provision that the server device is used to determine which assessments combinations of respective sections of routes and respective virtual contents have led to, wherein those combinations which exceed a predefined assessment number are offered for reproduction more frequently in the future than previously. In this way, particularly favorable combinations of respective sections of routes and respective virtual contents can be filtered out on the basis of the assessments by the vehicle occupants and offered more frequently in future. A reverse procedure is of course also possible in which particularly low assessments of specific combinations of sections of routes and combinations of virtual contents cause these combinations to be offered rather less frequently in future.

A further advantageous embodiment provides that the server device is used to determine with which combinations of respective sections of routes and respective virtual contents terminations of the reproduction of the virtual contents occurred, wherein those combinations which exceed a predefined termination rate are offered for reproduction less frequently in the future than previously. In this way, unfavorable combinations of specific route profiles and specific virtual contents can quite simply be determined solely on the basis of the termination rate, in order to offer these unfavorable combinations for reproduction less frequently in the future.

The system for evaluating contents reproduced in motor vehicles according to an advantageous embodiment of the method includes a vehicle-external server device and sensing devices for acquiring and transferring data to the vehicle-external server device, which data characterize a section of a route traveled along by the respective motor vehicle during the reproduction of the virtual contents, the respective reproduced virtual contents and/or states of the vehicle occupants during the reproduction of the virtual contents, wherein the server device is configured to evaluate the transferred data. Advantageous refinements of the method are to be considered as advantageous refinements of the system, or vice versa, wherein the system performs the method.

Further advantages, features and details will emerge from the following description of exemplary embodiments and with reference to the drawing. The features and combinations of features which are specified above in the description and the features and combinations of features which are specified below in the description of the figures and/or shown solely in the FIGURE can be used not only in the respectively specified combination but also in other combinations or alone without departing from the scope of the invention.

BRIEF DESCRIPTION OF THE DRAWINGS

These and other aspects and advantages will become more apparent and more readily appreciated from the following description of the exemplary embodiments, taken in conjunction with the accompanying drawing of a schematic illustration of a plurality of motor vehicles, in each of which a vehicle occupant who has put on virtual reality glasses is seated, and from which a very wide variety of data items are transferred to a vehicle-external server device by respective sensing devices.

DETAILED DESCRIPTION

Reference will now be made in detail to the preferred embodiments, examples of which are illustrated in the accompanying drawings, wherein like reference numerals refer to like elements throughout.

A plurality of motor vehicles 1, in which respective vehicle occupants 2 are seated with virtual reality glasses 3 which they have put on, are shown in a highly schematic illustration in the single FIGURE. Depending on the motor vehicle 1, a sensing device 4 is also illustrated in an entirely schematic fashion, the device being configured to acquire data which characterize a sections of routes traveled by the respective motor vehicle 1 during the reproduction of virtual contents, the respective reproduced virtual contents and/or states of the respective vehicle occupants 2 during the reproduction of the virtual contents, and to transfer the data to a server device 5. The server device 5 is configured to evaluate the transferred data. The respective sensing devices 4 and the vehicle-external server device 5 together form a system 6 for evaluating virtual contents reproduced in the respective motor vehicles 1.

A method for evaluating virtual contents reproduced in the motor vehicles 1 is described in more detail below. In this context, although reference is made to the virtual reality glasses 3, the explanations put forward with respect to the method below also apply to augmented reality glasses, augmented reality contact lenses or contact-analogous displays which are integrated into respective windows of the motor vehicles 1.

If it is sensed that a respective reproduction of virtual contents in one of the motor vehicles 1 by respective virtual reality glasses 3 has been terminated, data which have previously been acquired by the sensing device 4 are transferred to the vehicle-external server device 5. These data characterize a section of a route traveled by the respective motor vehicle 1 during the reproduction of the virtual contents, the respective reproduced virtual contents and/or states of the respective vehicle occupants 2 during the reproduction of the virtual contents. In particular, with regard to the respective reproduced virtual contents, information indicating how strong virtual movements within a respective displayed virtual surroundings were and/or what kind of story has been reproduced by the virtual contents is transmitted to the server device 5. In addition, information indicating when the respective reproduction of the virtual contents was terminated, that is to say for example how long before a respective anticipated end of the reproduction of the virtual contents this reproduction was at any rate terminated, can also be transferred to the server device 5. The transmission of the data can additionally also occur when the reproduction of the respective virtual contents has not been terminated.

The respective sensing devices 4 can sense for example a respective bend profile and/or altitude profile of the respective section of a route which was traveled by the respective motor vehicles 1 when the respective virtual contents were reproduced. Furthermore, it is possible that body measurement values which characterize sickness on the part of the vehicle occupants 2 are sensed by the sensing devices 4 during the reproduction of the virtual contents and transferred to the server device 5 which determines respective sickness values on the basis thereof. The sensing devices 4 may be, for example, smart watches which the vehicle occupants 2 wear on the wrist. The sensing device 4 can for example also have cameras which are mounted in the vehicle passenger compartment and which are configured to sense head movements of the vehicle occupant 2.

In this way, the server device 5 can for example determine with which combinations of respective sections of routes and respective virtual contents the determined sickness values have exceeded a predefined sickness value, wherein these combinations with which the predefined sickness value was exceeded are offered for reproduction in the motor vehicles 1 less frequently in future than previously. Given knowledge of the body measurement values, it is therefore possible to evaluate to what extent, under certain circumstances, the occurrence of sickness owing to simulator sickness or motion sickness has caused the respective vehicle occupants 2 to terminate the reproduction of the respective virtual contents.

If it is sensed that a reproduction of virtual contents in one of the motor vehicles 1 has been terminated by one of the vehicle occupants 2, it can also be sensed whether the respective vehicle occupant 2 then causes another virtual content to be reproduced or desists from reproducing any virtual contents, wherein data relating to this are likewise transferred to the server device 5. It is therefore possible for example to detect whether the vehicle occupant 2 basically would not like to consume any virtual contents during the journey or whether he rather prefers only certain other virtual contents.

In addition, after the termination of the reproduction of virtual contents it is also possible to output an inquiry to the respective vehicle occupant 2 as to why he has terminated the reproduction, wherein a response of the vehicle occupant 2 relating to the data are likewise transferred to the server device 5. The responses of the vehicle occupants 2 can then be evaluated in detail in order to determine the circumstances under which reproduced virtual contents are terminated.

On the other hand, if one of the vehicle occupants 2 does not for example terminate the reproduction of certain virtual contents until the reproduction has reached its expected end, an assessment can be requested from the respective vehicle occupant 2, wherein an assessment by the vehicle occupant 2 relating to the data are likewise transmitted to the server device 5. Assessments or data are therefore also present if the reproduction of virtual contents has in fact not been terminated so that on the basis of this information conclusions can be drawn as to which circumstances lead to the reproduction of virtual contents not being prematurely terminated. In this context, it is also possible, for example, to inquire from the vehicle occupant 2 how the reproduced virtual contents have fitted the section of a route traveled along during this time. It is therefore possible to acquire knowledge as to what kind of relationships are present between sections of routes traveled along and reproduced virtual contents, in order to be able to make optimizations in this respect. In particular, the server device 5 can determine which assessments the combinations of respective sections of routes and respective virtual contents have led to, wherein those combinations which exceed a predefined assessment number are offered for reproduction more frequently in future than previously.

Quite generally, the server device 5 can also determine with which combinations of respective sections of routes and respective virtual contents terminations of the reproduction of the virtual contents occurred, wherein those combinations which exceed a predefined termination rate are offered for reproduction in the motor vehicles 1 less frequently in the future than previously.

By the explained method and system 6 it is therefore possible to evaluate terminated reproductions of virtual contents in motor vehicles 1 in a detailed fashion in order to optimize the reproduction of the virtual contents in the motor vehicles 1 on the basis thereof. It is therefore possible, for example, to identify quality deficiencies with respect to the actual storytelling of the virtual contents as well as the technical nature, in particular with respect to so-called motion sickness. The data may be transmitted in a completely anonymized fashion to the server device 5, so that at any time allowance can be made for data protection of the respective vehicle occupants 2.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for evaluating virtual contents reproduced in motor vehicles, comprising:
   detecting whether reproduction of the virtual contents in the motor vehicles has been terminated by vehicle occupants, respectively;
   transferring relevant data characterizing sections of routes traveled by the motor vehicles during reproduction of the virtual contents, and at least one of the virtual contents and states of vehicle occupants during the reproduction of the virtual contents, respectively, to a vehicle-external server device, upon detection that each respective reproduction of the virtual contents in one of the motor vehicles has been terminated by respective vehicle occupants;
   upon detection that the respective reproduction of the virtual contents in the one of the motor vehicles has been terminated by a respective vehicle occupant, at least one of
      sensing whether the respective vehicle occupant then causes another virtual content to be reproduced, and
      inquiring as to why the respective vehicle occupant has terminated the respective reproduction and transferring response data relating to a response of the respective vehicle occupant to the server device;
   evaluating at least the relevant data by the vehicle-external server device including, with regard to a respective section of a respective route traveled by a respective motor vehicle during the reproduction of respective virtual contents, a respective bend profile and/or altitude profile of the respective section of the respective route to determine unacceptable combinations of specific sections of the routes and respective virtual contents terminations of the reproduction of the virtual contents occurred; and
   optimizing the reproduction of the virtual contents in the motor vehicles based on evaluation of at least the relevant data, including offering excessive combinations which exceed a predefined termination rate for reproduction less frequently than previously.

2. The method according to claim 1, wherein the virtual contents are reproduced by at least one of virtual reality glasses, augmented reality glasses and augmented reality contact lenses worn by the vehicle occupants, and contact-analogous displays integrated into at least one window of the motor vehicles.

3. The method according to claim 1, wherein the relevant data includes at least one of content information indicating how strong virtual movements within respective displayed virtual surroundings were and what kind of story has been reproduced by the virtual contents.

4. The method according to claim 3, further comprising transferring timing information indicating when the respective reproduction of the respective virtual contents was terminated to the vehicle-external server device.

5. The method according to claim 4,
   further comprising sensing, during the reproduction of the virtual contents, body measurement values characterizing sickness of the vehicle occupants by a sensing device located at least one of in the motor vehicles and on devices worn by the vehicle occupants,
   wherein the relevant data transferred to the vehicle-external server device includes the body measurement values, and
   wherein the evaluating includes obtaining respective sickness values based on the body measurement values.

6. The method according to claim 5, wherein the sensing of the body measurement values includes sensing at least one of a pulse and head movements which characterize the sickness of the vehicle occupants.

7. The method according to claim 6,
   wherein the evaluating includes determining, by the vehicle-external server device, the excessive combinations of the specific sections of the routes and the respective virtual contents terminations for which the respective sickness values have exceeded a predefined sickness value, and
   wherein, as a result of the optimizing, the excessive combinations having the respective sickness values exceeding the predefined sickness value are offered for reproduction less frequently than previously.

8. The method according to claim 7, further comprising, upon sensing that the respective reproduction of the virtual contents has not been terminated by the respective vehicle occupant until the respective reproduction has concluded,
   requesting an assessment from the respective vehicle occupant; and
   transferring assessment data relating to the assessment by the respective vehicle occupant to the vehicle-external server device.

9. The method according to claim 8,
   wherein the evaluating by the vehicle-external server device determines acceptable combinations of appropriate sections of the routes and corresponding virtual contents which exceed a predefined assessment number, and
   wherein, as a result of the optimizing, the acceptable combinations exceeding the predefined assessment number are offered for reproduction more frequently than previously.

10. The method according to claim 1, further comprising transferring timing information indicating when the respective reproduction of the respective virtual contents was terminated to the vehicle-external server device.

11. The method according to claim 1,
    further comprising sensing, during the reproduction of the virtual contents, body measurement values characterizing sickness of the vehicle occupants by a sensing device located at least one of in the motor vehicles and on devices worn by the vehicle occupants,
    wherein the relevant data transferred to the vehicle-external server device includes the body measurement values, and
    wherein the evaluating includes obtaining respective sickness values based on the body measurement values.

12. The method according to claim 11,
    wherein the evaluating includes determining, by the vehicle-external server device, the excessive combinations of the specific sections of the routes and the respective virtual contents terminations for which the respective sickness values have exceeded a predefined sickness value, and
    wherein, as a result of the optimizing, the excessive combinations having the respective sickness values exceeding the predefined sickness value are offered for reproduction less frequently than previously.

13. The method according to claim 12, wherein the sensing of the body measurement values includes sensing at least one of a pulse and head movements which characterize the sickness of the vehicle occupants.

14. The method according to claim 1, further comprising, upon sensing that the respective reproduction of the virtual contents has not been terminated by the respective vehicle occupant until the respective reproduction has concluded,
- requesting an assessment from the respective vehicle occupant; and
- transferring assessment data relating to the assessment by the respective vehicle occupant to the vehicle-external server device.

15. The method according to claim 14,
- wherein the evaluating by the vehicle-external server device determines acceptable combinations of appropriate sections of the routes and corresponding virtual contents which exceed a predefined assessment number, and
- wherein, as a result of the optimizing, the acceptable combinations exceeding the predefined assessment number are offered for reproduction more frequently than previously.

16. A system for evaluating virtual contents reproduced in motor vehicles, comprising:
- a vehicle-external server device; and
- sensing devices configured to
    - acquire and transfer relevant data to the vehicle-external server device, the relevant data characterizing a section of a route traveled by one of the motor vehicles during reproduction of respective virtual contents, and at least one of the respective virtual contents and states of at least one vehicle occupant during the reproduction of the respective virtual contents,
    - not transfer the relevant data to the vehicle-external server device until the reproduction of the respective virtual contents in the one of the motor vehicles has been terminated by the at least one vehicle occupant of the at least one motor vehicle,
    - sense termination of the reproduction of the respective virtual contents in the one of the motor vehicles by the at least one vehicle occupant,
    - sense whether the at least one vehicle occupant causes another virtual content to be reproduced after sensing the termination of reproducing the respective virtual contents,
    - at least one of
        - transfer termination data relating to the termination of the reproduction of the respective virtual contents to the vehicle-external server device, and
        - output an inquiry to the at least one vehicle occupant as to why the at least one vehicle occupant has terminated the reproduction, and transfer response data, relating to a response of the at least one vehicle occupant, to the server device,
- wherein the vehicle-external server device is configured to
    - evaluate the relevant and response data,
    - optimize the reproduction of the respective virtual contents in the one of the motor vehicles based on evaluation of at least one of the section of the route traveled by the one of the motor vehicles during the reproduction of the respective virtual contents, a respective bend profile and a respective altitude profile of the section of the route,
    - determine combinations of respective sections of routes and respective virtual contents terminations of the reproduction of the corresponding virtual contents,
    - offer the combinations which exceed a predefined termination rate less frequently for reproduction than previously.

* * * * *

UNITED STATES PATENT AND TRADEMARK OFFICE
CERTIFICATE OF CORRECTION

| | | |
|---|---|---|
| PATENT NO. | : 11,327,559 B2 | Page 1 of 1 |
| APPLICATION NO. | : 17/262510 | |
| DATED | : May 10, 2022 | |
| INVENTOR(S) | : Marcus Kuehne | |

It is certified that error appears in the above-identified patent and that said Letters Patent is hereby corrected as shown below:

On the Title Page

Item (73)
Column 1, Line 1, delete "Ingolstady" and insert --Ingolstadt--.

Signed and Sealed this
Twenty-eighth Day of June, 2022

Katherine Kelly Vidal
*Director of the United States Patent and Trademark Office*